US006385543B1

United States Patent
Keiser

(10) Patent No.: US 6,385,543 B1
(45) Date of Patent: May 7, 2002

(54) METHOD OF FEATURE EXTRACTION USING COMBINATION OF WAVELET AND FOURIER TRANSFORMATION

(75) Inventor: James M. Keiser, Hanover, MD (US)

(73) Assignee: The United States of America represented by the National Security Agency, Washington, DC (US)

( * ) Notice: Subject to any disclaimer, the term of this patent is extended or adjusted under 35 U.S.C. 154(b) by 0 days.

(21) Appl. No.: 09/571,964

(22) Filed: May 17, 2000

(51) Int. Cl.[7] .............................................. G06F 19/00
(52) U.S. Cl. ............................................. 702/1; 703/10
(58) Field of Search .............................. 367/38, 46, 83; 702/6, 1, 14; 382/232; 455/63; 375/130, 346; 703/10; 708/404, 405

(56) References Cited

U.S. PATENT DOCUMENTS

| | | | |
|---|---|---|---|
| 4,853,903 A | | 8/1989 | Linville et al. ................ 367/43 |
| 5,862,260 A | * | 1/1999 | Rhoads ........................ 382/232 |
| 5,974,181 A | | 10/1999 | Prieto .......................... 382/232 |
| 6,014,412 A | | 1/2000 | Wiese .......................... 375/346 |
| 6,122,309 A | * | 9/2000 | Bergstrom et al. ........... 375/130 |
| 6,131,013 A | * | 10/2000 | Bergstrom et al. ............. 455/63 |

* cited by examiner

*Primary Examiner*—Edward Lefkowitz
*Assistant Examiner*—Victor J. Taylor
(74) *Attorney, Agent, or Firm*—Robert D. Morelli

(57) ABSTRACT

The present invention is a method of removing at least one feature from a signal by receiving the signal in the time domain; identifying at least one frequency to be removed; identifying a number of resolution levels to which the signal will be reduced using wavelet transformation; computing at least one wavelet difference coefficient for each resolution level and at least one wavelet average coefficient for the lowest resolution level; creating a projection of each at least one frequency onto the lowest resolution level using Fourier transformation; subtracting the projection from the corresponding at least one wavelet average coefficient; and adding the results of the last step to the at least one wavelet difference coefficient.

6 Claims, 1 Drawing Sheet

METHOD OF FEATURE EXTRACTION USING COMBINATION OF WAVELET AND FOURIER TRANSFORMATION

FIELD OF THE INVENTION

The present invention relates, in general, to data processing with respect to measuring, calibrating, or testing, and, in particular, to filtering or noise reduction/removal.

BACKGROUND OF THE INVENTION

Any unwanted component in a signal may be viewed as an interferer. To remove an interferer, the signal must first be expanded. Signal expansion methods include Fourier transformation, Taylor series expansion, wavelet transformation, and so on. An expanded signal is then modified to remove the interferer. The inverse of the expansion method is then performed on the expanded and modified signal to obtain the original signal minus the interferer.

If Fourier transformation is used as the expansion method then a time domain signal is converted to the frequency domain, the coefficients of the frequency domain signal are modified, and an Inverse Fourier transform is performed on the modified coefficients to produce, in the time domain, the signal minus the interferer. A Fourier transformation provides spectral accuracy, but may be time consuming or impossible if the signal includes a large amount of data.

A Taylor series expansion is both general and relatively simple to apply, but it is not always easy to determine what effect a modification on a Taylor series expansion coefficient will have on the signal when the inverse of the Taylor series expansion is applied to the modified coefficients.

Another method of removing an interferer from a signal is to multiply each data point in the signal by some factor. However, combinations of pointwise multiplication is less efficient in a domain other than the time domain and it is difficult, if not impossible, to remove a frequency component from a signal by manipulating the signal in the time domain.

Wavelet transformation is a relatively new method of expanding a signal that is being used for data compression and noise reduction. A wavelet transformation involves the use of at least two filters. Typically, the filters are a high-pass filter and a low-pass filter. However, other filters may be used (e.g., Harr, IIR, FIR, bandpass, etc.). The number of samples produced by each filter is half the number of samples of the original signal. Data compression is an inherent benefit of wavelet transformation. The output of each filter may be further wavelet transformed, and Nyquist's sampling theory sets the upper limit on the number of wavelet transformations that may be nested and still allow the original signal to be completely reconstructed. That is, the number of bits in the output of a filter should be no less than two. In mathematical terms, $N=2^n$, where N is the number of bits, or samples, in the signal to be wavelet transformed, and where n is one plus the maximum number of wavelet transformations that may be nested and still allow the original signal to be completely reconstructed. For example, if a signal consists of 64 bits, or samples, then the maximum number of wavelet transformations that may be nested is five. The number of bits in the outputs of the filters for five nested wavelet transformations are 32, 16, 8, 4, and 2, respectively.

Noise reduction methods that use wavelet transformation typically consist of setting a wavelet transformation coefficient to zero if the coefficient falls below a user-definable threshold. Setting one wavelet transformation coefficient to zero without considering the coefficients that are above the user-definable threshold may introduce local discontinuities in the wavelet transform domain which could cause distortion in the signal upon applying an inverse wavelet transformation to the modified wavelet coefficients.

A signal may be expanded in a wavelet basis to a nesting level of J as follows, where $J \leq n$, where n is defined as above.

$$f(t) = \sum_{j=1}^{J} \sum_{k=0}^{2^{n-j}-1} (d_k^j \times \Psi_{j,k}(t)) + \sum_{k=0}^{2^{n-j}-1} (s_k^J \times \varphi_{j,k}(t))$$

Wavelet coefficient $d_k^j$ represents a measure of the change in trend, or transience, in the function f(t) on scale j at position k, and is referred to as a difference. Wavelet coefficient $s_k^j$ represents a measure of the trend in the function f(t) on scale j at position k, and is referred to as an average. These difference and average coefficients are computed recursively as follows, for each $j=1,2,\ldots,J$ and $k=0,1,\ldots,2^{n-j}-1$.

$$d_k^j = \sum_{l=0}^{L-1} g_l s_{l+2k+1}^{j-1}$$

$$s_k^j = \sum_{l=0}^{L-1} h_l s_{l+2k+1}^{j-1}$$

$$s_k^0 = f(t_k)$$

U.S. Pat. No. 4,853,903, entitled "METHOD AND APPARATUS FOR REMOVING SINUSOIDAL NOISE FROM SEISMIC DATA," discloses a device for and method of removing an interferer from a signal by using Fourier transformation. The device and method of U.S. Pat. No. 4,853,903 is computationally intense for, and may not work on, signals that include a large number of samples, whereas the present invention is less computationally intense for, and would work on, such signals. U.S. Pat. No. 4,853,903 is hereby incorporated by reference into the specification of the present invention.

U.S. Pat. No. 5,974,181, entitled "DATA COMPRESSION SYSTEM, METHOD, AND APPARATUS," discloses a device for and method of compressing a signal using wavelet transformation and, in an alternate embodiment, Fourier transformation. However, U.S. Pat. No. 5,974,181 does not disclose the method of removing an interferer from a signal as does the present invention. U.S. Pat. No. 5,974,181 is hereby incorporated by reference into the specification of the present invention.

U.S. Pat. No. 6,014,412, entitled "DIGITAL RADIO FREQUENCY INTERFERENCE CANCELLER," discloses a device for and method of removing an interferer from a signal by working with the signal in the frequency domain, obtaining an estimate of the interferer, and subtracting the estimate from the signal. The method of U.S. Pat. No. 6,014,412 is computationally intense for, and may not work on, signals that include a large number of samples, whereas the present invention is less computationally intense for, and would work on, such signals. U.S. Pat. No. 6,014,412 is hereby incorporated by reference into the specification of the present invention.

SUMMARY OF THE INVENTION

It is an object of the present invention to remove a feature from a signal.

It is another object of the present invention to remove a feature from a signal by a combination of wavelet and Fourier transformation.

It is another object of the present invention to remove a frequency from a time domain signal by reducing the samples in the signal by wavelet transformation, projecting the feature to be removed onto a wavelet basis using Fourier transformation and subtracting the projection of the feature from the projection of the original time domain signal.

The present invention is a method of removing at least one user-definable frequency from a signal in a manner that is, computationally, more efficient than prior art methods and may be applied to signals containing a number of samples that cannot be processed by prior art methods.

The first step of the method is receiving a signal in the time domain.

The second step of the method is identifying at least one frequency to be removed from the signal.

The third step of the method is identifying a possible number of resolution levels to which the signal will be reduced using wavelet transformation.

The fourth step of the method is computing at least one wavelet difference coefficient for each of the number of resolution levels identified in the third step and at least one wavelet average coefficient for the number of resolution levels that is at the lowest resolution level (i.e., numerically last).

The fifth step of the method is creating a projection of each at least one frequency selected in the second step onto the lowest, or numerically last, of the resolution levels identified in the third step using Fourier transformation.

The sixth step of the method is subtracting the result of the fifth step from the corresponding at least one wavelet average coefficient computed in the fourth step.

The seventh, and last, step of the method is adding the results of the sixth step to the at least one wavelet difference coefficient computed in the fourth step. The result of the seventh step is the received signal minus the at least one user-definable frequency.

DETAILED DESCRIPTION

Figure 1:
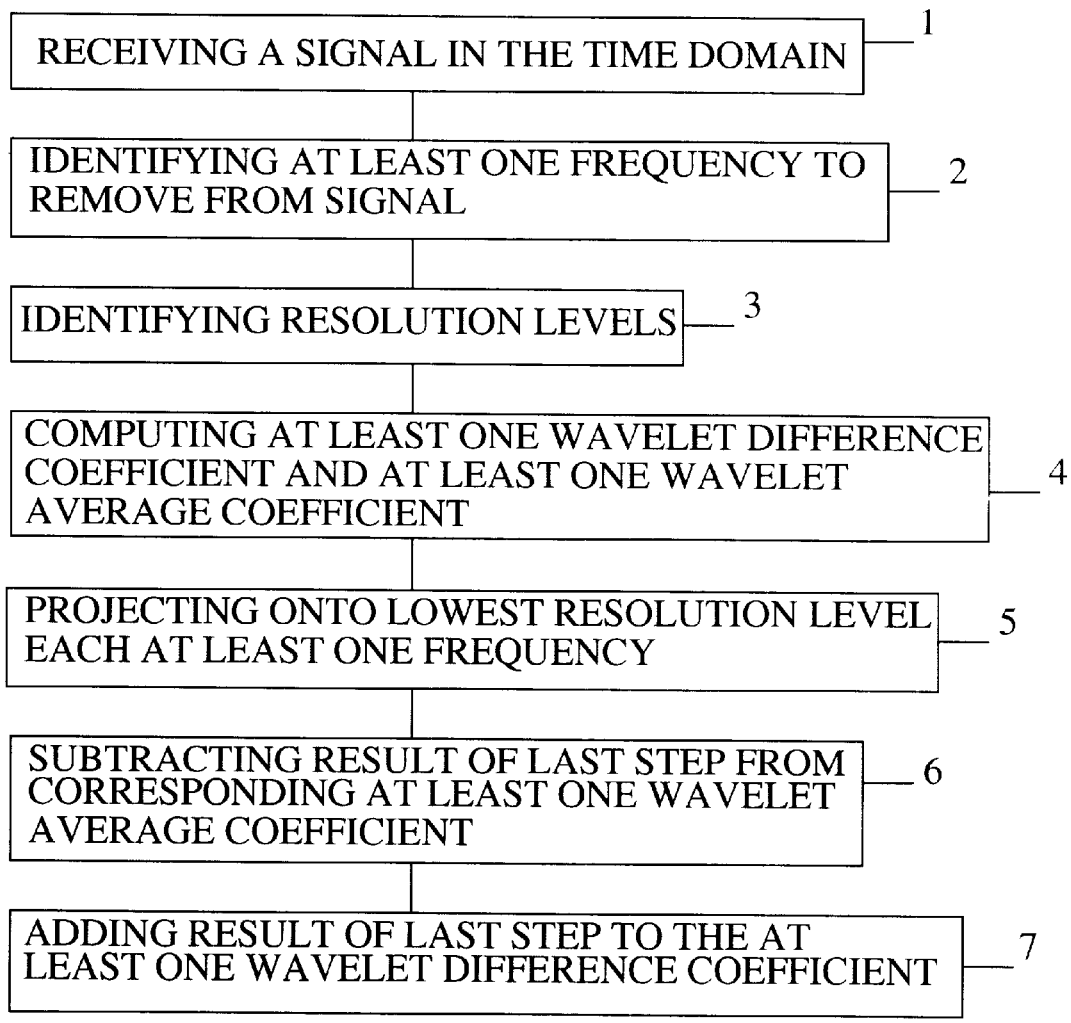
FIG. 1 is a list of steps of the present invention.

The present invention is a method of removing at least one user-definable frequency from a signal in a manner that is, computationally, more efficient than prior art methods and may be applied to signals containing a number of samples that cannot be processed by prior art methods. It is estimated that a prior art method based on Fourier transformation requires on the order of $O_F(n)=O(n2^n)+O(2^n)$ operations whereas the present invention only requires on the order of $O_M(n,J)=O(2^n)+O(2^{n-J}(n-J))$ operations, where n is one plus the maximum number of nested expansions that may be performed on the signal which allows complete reconstruction of the signal, and where J is one minus the number of nested expansions actually performed. The saving in computational complexity that the present invention provides over the prior art increases as the size of the samples in the signal to be processed increases.

FIG. 1 is a list of the steps of the present method.

The first step 1 of the method is receiving a signal in the time domain.

The second step 2 of the method is identifying at least one frequency to be removed from the signal. A frequency to be removed may be sinusoidal or non-sinusoidal. An example of a sinusoidal signal is the carrier signal on which the data signal travels. Removal of the carrier signal aids in the recovery of the data signal. An example of a non-sinusoidal signal is pulse noise.

The third step 3 of the method is identifying a number of resolution levels to which the signal will be reduced using wavelet transformation. The number selected must be less than or equal to the maximum number of resolution levels to which the signal may be expanded and still retain enough information to fully reconstruct the signal. In the preferred embodiment, the number is set to the maximum number of levels to which the signal may be expanded and still retain enough information to completely reconstruct the signal because such a number minimizes the number of samples to be processed and, therefore, the number of computations to be performed. The reason for this is that each expansion level reduces the number of samples by any constant factor, where the constant factor is typically set to two.

The fourth step 4 of the method is computing at least one wavelet difference coefficient for each of the number of resolution levels identified in the third step 3 and at least one wavelet average coefficient for the number of resolution levels that is at the lowest resolution level (i.e., numerically last).

The fifth step 5 of the method is creating a projection onto the lowest, or numerically last, of the resolution levels identified in the third step 3 of each at least one frequency selected in the second step 2 using Fourier transformation. Creating a projection on the lowest resolution level not only minimizes the amount of samples that must be processed and, therefore, reduces the computational complexity of the present invention as compared to the prior art methods but also enables signals to be processed that may not be processed by the prior art methods.

The fifth step 5 is comprised of the steps of computing the discrete Fourier transform on the at least one wavelet average coefficient computed in the fourth step 4, extracting Fourier coefficients corresponding to the frequencies of the at least one frequency to be removed, computing an amplitude $\alpha$ and a phase $\phi$ corresponding to the lowest resolution level identified in the third step 3 for each at least one frequency to be removed, and forming the projection of each at least one frequency to be removed onto the lowest resolution level as follows.

$$(P_J C)(k) = 2 \sum_{i=0}^{l-1} \alpha_i \cos(2\pi \omega_i t_k + \phi_i)$$

The unit time interval is uniformly discretized into $2^{n-J}$ subintervals labeled by $t_k$ and $0<k<2^{n-J}-1$.

The sixth step 6 of the method is subtracting the result of the fifth step 5 from the corresponding at least one wavelet average coefficient computed in the fourth step 4 as follows.

$$\tilde{s}_k^J = s_k^J - (P_J C)(k)$$

The seventh, and last, step 7 of the method is adding the results of the sixth step 6 to the at least one wavelet difference coefficient computed in the fourth step 4 as follows.

$$\tilde{f}(t) = \sum_{j=1}^{J} \sum_{k=0}^{2^{n-j}-1} (d_k^j \times \Psi_{j,k}(t)) + \sum_{k=0}^{2^{n-j}-1} \tilde{s}_k^J \times \varphi_{j,k}(t)$$

The result of the seventh step is the wavelet representation of the received signal minus the at least one user-definable frequency.

What is claimed is:

1. A method of removing at least one user-definable feature from a signal, comprising the steps of:
   a) receiving the signal in the time domain;
   b) identifying at least one frequency to be removed from the signal;
   c) identifying a number of resolution levels from highest to lowest to which the signal will be reduced using wavelet transformation, where the number is less than or equal to the maximum number of resolution levels to which the signal may be expanded and still retain enough information to fully reconstruct the signal;
   d) computing at least one wavelet difference coefficient for each resolution level identified in step (c) and at least one wavelet average coefficient for the lowest resolution level identified in step (c);
   e) creating a projection onto the lowest resolution level identified in step (c) of each at least one frequency selected in step (b) using Fourier transformation;
   f) subtracting the result of step (e) from the corresponding at least one wavelet average coefficient computed in step (d) as follows:

$$\tilde{s}_k^J = s_k^J - (P_J C)(k);$$

and g) adding the results of step (f) to the at least one wavelet difference coefficient computed in step (d) as follows:

$$\tilde{f}(t) = \sum_{j=1}^{J} \sum_{k=0}^{2^{n-j}-1} (d_k^j \times \Psi_{j,k}(t)) + \sum_{k=0}^{2^{n-j}-1} \tilde{s}_k^J \times \varphi_{j,k}(t).$$

2. The method of claim 1, wherein said step of identifying at least one frequency to be removed from the signal is comprised of selecting at least one frequency from the group of frequencies consisting of sinusoidal frequencies and non-sinusoidal frequencies.

3. The method of claim 1, wherein said step of identifying a number of resolution levels is comprised of the step of identifying a number of resolution levels that include a resolution level that is the maximum resolution level to which the signal may be expanded and still retain enough information to completely reconstruct the signal.

4. The method of claim 1, wherein said step of creating a projection of each at least one frequency is comprised of the steps of:
   a) computing a discrete Fourier transform on the at least one wavelet average coefficient computed in step (d);
   b) extracting Fourier coefficients corresponding to the at least one frequency to be removed;
   c) computing an amplitude $\alpha$ and phase $\phi$ corresponding to the lowest resolution level identified in step (c) for each at least one frequency to be removed; and
   d) forming the projection of each at least one frequency to be removed onto the lowest resolution level as follows:

$$(P_J C)(k) = 2 \sum_{i=0}^{l-1} \alpha_i \cos(2\pi \omega_i t_k + \phi_i).$$

5. The method of claim 2, wherein said step of identifying a number of resolution levels is comprised of the step of identifying a number of resolution levels that includes a resolution level that is the maximum resolution level to which the signal may be expanded and still retain enough information to completely reconstruct the signal.

6. The method of claim 5, wherein said step of creating a projection of each at least one frequency is comprised of the steps of:
   a) computing a discrete Fourier transform on the at least one wavelet average coefficient computed in step (d);
   b) extracting Fourier coefficients corresponding to the at least one frequency to be removed;
   c) computing an amplitude $\alpha$ and phase $\phi$ corresponding to the lowest resolution level identified in step (c) for each at least one frequency to be removed; and
   d) forming the projection of each at least one frequency to be removed onto the lowest resolution level as follows:

$$(P_J C)(k) = 2 \sum_{i=0}^{l-1} \alpha_i \cos(2\pi \omega_i t_k + \phi_i)$$

\* \* \* \* \*